United States Patent
Carter et al.

(10) Patent No.: US 9,206,927 B2
(45) Date of Patent: Dec. 8, 2015

(54) UTILITY CONDUIT SUPPORTING DEVICE, SYSTEM, AND METHOD

(71) Applicants: Brian K. Carter, Plainfield, IN (US); Abraham E. Bishop, Danville, IN (US)

(72) Inventors: Brian K. Carter, Plainfield, IN (US); Abraham E. Bishop, Danville, IN (US)

(*) Notice: Subject to any disclaimer, the term of this patent is extended or adjusted under 35 U.S.C. 154(b) by 0 days.

(21) Appl. No.: 13/897,408

(22) Filed: May 18, 2013

(65) Prior Publication Data

US 2013/0320157 A1    Dec. 5, 2013

Related U.S. Application Data

(60) Provisional application No. 61/648,702, filed on May 18, 2012.

(51) Int. Cl.
*F16L 3/22* (2006.01)
*F16L 3/12* (2006.01)
*F16L 3/24* (2006.01)

(52) U.S. Cl.
CPC . *F16L 3/12* (2013.01); *F16L 3/221* (2013.01); *F16L 3/24* (2013.01); *Y10T 29/49947* (2015.01)

(58) Field of Classification Search
CPC .................................. F16L 3/24; F16B 2/065
USPC ....................................... 248/68.1, 62, 72, 73
See application file for complete search history.

(56) References Cited

U.S. PATENT DOCUMENTS

| | | |
|---|---|---|
| 5,188,318 A | 2/1993 | Newcomer et al. |
| 5,564,659 A | 10/1996 | DeCapo |
| 5,587,555 A | 12/1996 | Rinderer |
| 5,897,088 A | 4/1999 | Kirschner |
| 5,971,329 A * | 10/1999 | Hickey .................. 248/68.1 |
| 7,287,728 B2 | 10/2007 | Shuey |
| 7,484,697 B1 * | 2/2009 | Nelson ..................... 248/62 |
| 7,520,476 B2 | 4/2009 | Caveney et al. |
| 2007/0235596 A1 | 10/2007 | Youmans |

FOREIGN PATENT DOCUMENTS

CN    201889611 U    7/2011

* cited by examiner

*Primary Examiner* — Monica Millner
(74) *Attorney, Agent, or Firm* — SmithAmundsen LLC; Dennis S. Schell

(57) ABSTRACT

A utility conduit supporting device, system, and method for quickly and inexpensively securing multiple conduits, including cables, pipes, or other utility lines, to structural members such as I-beams and other planar or curved structural members, includes one or more clamping members, such as one or more beam clamps, and one or more elongate platforms with spaced apart connections for attachment members, e.g., conduit clamps. The device and method can be used to install utility conduits in multiple orientations, to readily fit between, over, under, or away from existing installations when additional conduits are needed, without having to measure, drill, and tap conduit supporting straps and without having to disassemble and reassemble existing installations, and to make use of void, unused spaces on structural members.

7 Claims, 16 Drawing Sheets

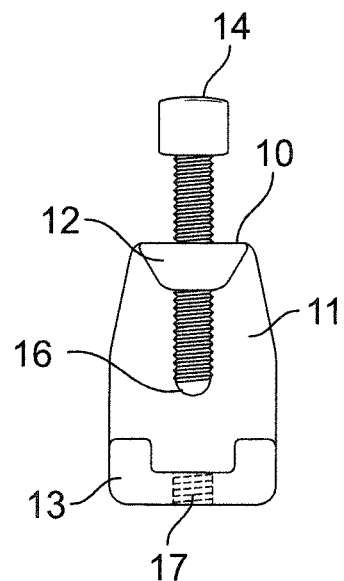
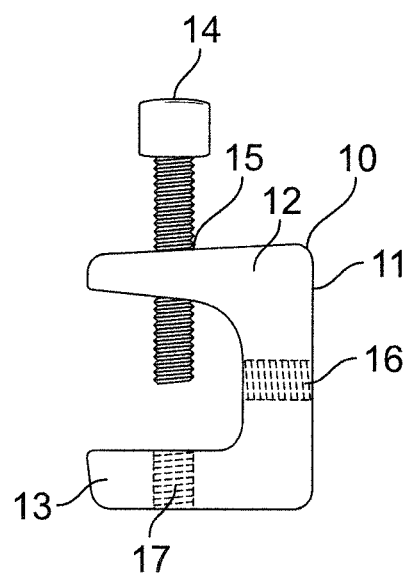
FIG. 1A  FIG. 1B
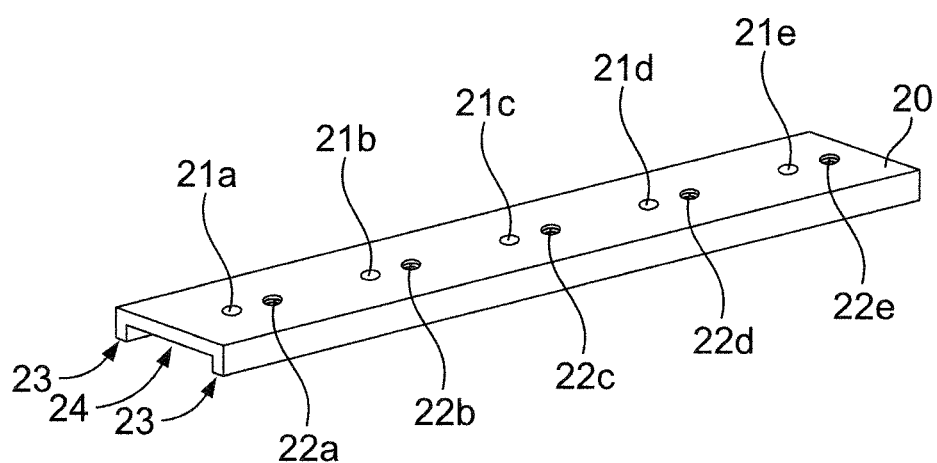
FIG. 2A

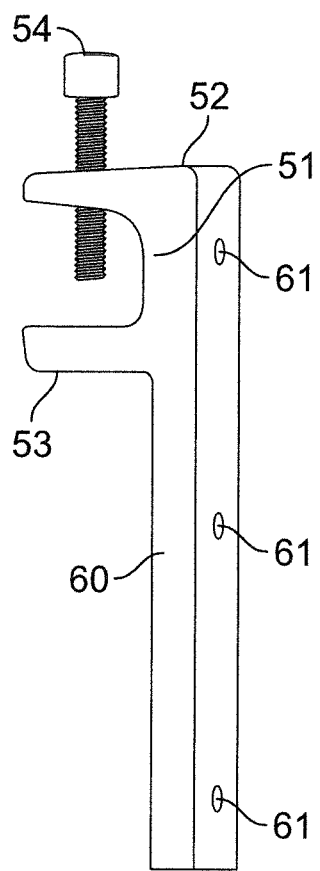
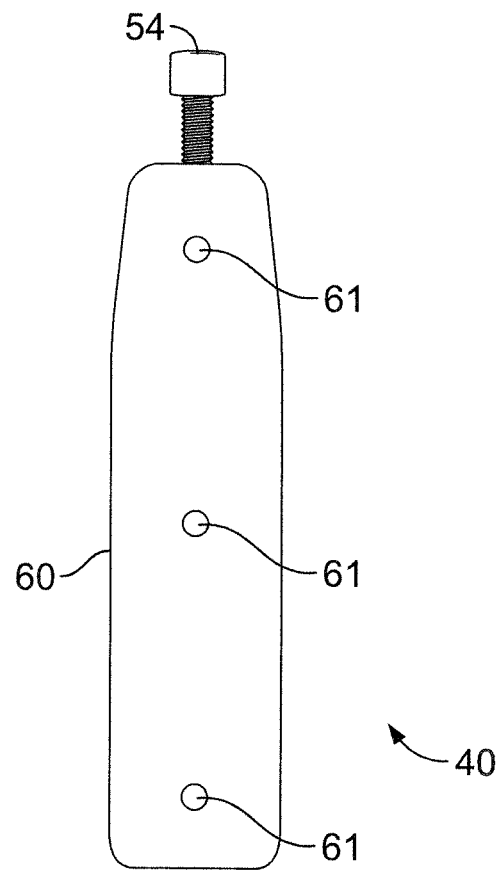
FIG. 7A  FIG. 7B

US 9,206,927 B2

UTILITY CONDUIT SUPPORTING DEVICE, SYSTEM, AND METHOD

CROSS-REFERENCE TO RELATED APPLICATIONS

This is a nonprovisional patent application of U.S. Provisional Patent Application No. 61/648,702, filed May 18, 2012, and titled CONDUIT SUPPORTING DEVICE, SYSTEM, AND METHOD, which is incorporated herein by reference.

BACKGROUND

This invention relates generally to a support and anchoring system for utility conduits. More particularly, this invention relates to a system, device and method for quickly and inexpensively supporting and securing multiple utility conduits, including, for example, cables, pipes, and other utility lines, to building structural members such as I-beams and other planar or curved structural members.

One type of utility conduit is often used to provide protection for electrical or optical conductors in wiring of residential, commercial and industrial premises. Depending upon the application, these conduits can protect the conductors from impact, moisture, chemical vapors and the like. The conduits can also offer the additional benefit of ease of changing electrical conductors, e.g., existing conductors can be withdrawn and new conductors installed. Various types of utility conduits are also used for the transmission of fluids and gases in residential, commercial and industrial structures, generally referred to as pipes.

Various types of utility conduits are commercially available, such as those commonly known as electrical metallic tubing (EMT) conduits (most commonly made of steel), flexible metallic conduits (FMC), steel or aluminum rigid metal conduit (RMC), steel galvanized rigid conduit (GRC), steel intermediate metal conduits (IMC), metallic conduits with a supplementary polyvinyl chloride (PVC) coating, as well as conduits made from non-metallic materials, for example, PVC conduits. Depending on the type of conduit used and the particular installation requirements, the trade sizes of conduit can generally range from ½" to ~4".

There has been a significant increase in recent years in the use of conduits in both industrial and residential applications to encase electrical conductors, including power wiring, computer wiring, and communication cables, and for the transmission of fluids, such as oil or water, as well as for the transmission of gases. For a variety of reasons including safety and practicality, it is necessary to fix the conduits in an anchored position at installation sites, such as in factories, commercial structures, and residential structures. The conduits, if left unanchored, can become dislodged from primary anchoring arrangements due to play over their length, and thwart proper installation. Installation codes, such as local electrical and other building codes, normally mandate the use of certain conduit anchoring and hanging devices.

Various primary and secondary means for maintaining conduits and piping in fixed anchored spatial locations have been developed and have contributed to the state of the art. Thus, various hanging devices are frequently used for supporting the conduits from ceilings or overhead areas of factory, commercial, and residential structures. In such installations, the conduit hanging devices are typically secured to building structural members, including ceiling beams, overhead trusses, studs, and similar planar or curved structures, and the conduits are then secured to the hanging devices.

Building structural member surfaces on which the hanging devices are typically installed, particularly in factories and commercial structures, include planar structural members such as those known synonymously as I-beams or H-beams in reference to their I- or H-shaped cross-section. I- or H-beams are also variously referred to as W-beams (for wide flange), Universal Beams (UB), Rolled Steel Joists (RSJ), or double-T beams. The horizontal elements of the "I" are referred to as flanges, while the vertical element between the flanges is referred to as the web. Building structural members as used herein is not intended to be limited to members that structurally support the building, but rather includes any member that is attached to the building structure.

Often such conduit hanging devices and support systems are constructed from a combination of both prefabricated parts and non-fabricated parts to attempt to reduce on-site installation time and labor costs. The most common prefabricated parts include hanging devices include mounting clamps such as those commonly known as beam clamps and the like. Beam clamps are commercially available in various sizes and shapes, such as those referred to in the art as a C-clamp or an F-clamp in reference to their shape. Beam clamps generally possess a jaw opening and a fastening member, the latter member being a screw-type fastener, a spring-type fastener, a manual toggle-type fastener, and the like. By far, most types of beam clamps possess a screw-type fastener. Beam clamps also usually include one or more threaded holes. A very common, commercially available type of beam clamp comes with a threaded hole on the back side opposite the jaw and another threaded hole on the bottom side opposite the fastener.

In addition to the beam clamp, the hanging device also includes a conduit securing member such as a metal or non-metal strap or conduit clamp. Numerous types of straps are commercially available, such as those known as one-hole straps or two-hole straps. Common commercial examples include those referred to in the art as Minerallac conduit straps, Unistrut straps, universal conduit straps, and the like. The strap is attached to the beam clamp at one of the beam clamp's threaded holes via a fastener such as a screw. In its basic form, this combination of the beam clamp and strap makes up the conduit hanging device. Thus, the clamping member of the hanging device is clamped onto, e.g., the flange of an I-beam by tightening the fastener, and the strapping member is used to secure the conduit. To illustrate, FIG. 12 shows a perspective view exemplifying the common method currently used in the art to secure utility conduits 150 (represented by arrowed lines) to an I-beam 200 at the I-beam's flanges 201, using standard beam clamps 10 and securing members (not shown).

Additionally, non-fabricated components often include straps, rod, or flat stock that must be measured, cut to length, and sometimes further measured, drilled, and threaded. Even using a combination of prefabricated and non-fabricated components, assembly of the hanging devices and support systems is often slow due in part to archaic design considerations, complexity of components, and wide-ranging specific installation obstacles, spacing and location requirements. Also, poor lighting and/or hazardous conditions often surrounding such locations, and a generally unfavorable position of the installer with respect to the work being performed, make even the simple operation of installing the device a time-consuming and tedious task, resulting in increased costs and time delays.

Additionally, after the initial installation of the conduits, none of the existing hanging devices or support systems provide the ability to easily and inexpensively add additional conduit support members should the need arise at a later time to install additional conduits. Furthermore, in some installations where multiple conduits are crowded along a support strut, there is insufficient room on the support strut to mount one or more additional required conduits. Often, a second support strut is suspended below the first support strut to provide a surface upon which the conduit may be mounted.

Installation of a second support strut is expensive and time-consuming. Moreover, securing conduits is typically done by attaching the support systems to the edge (or flange) of the I-beams or structural members (i.e., only a small area of the I-beams or structural members is used) leaving unused, wasted space on the various surfaces of the structural members. Attaching the support systems to the edge very often prevents or blocks access to the void spaces on the I-beam or structural member should a need arise at a later time to install additional conduits. In the latter case, the installer would have to first disassemble previously installed support systems in order to carry out re-installation to accommodate the additional conduits, which is time-consuming and costly, and often creates safety issues. Other problems are often encountered by installers due to the presence at the installation location of rods, beams, brackets and other devices that interfere with and obstruct the addition of new conduits, pipes and support systems.

Support systems that have been devised in the art to overcome some of the above problems are often elaborate, complicated, costly, functionally limited, and lacking in versatility and simplicity. Following are some examples of some support systems to illustrate this point.

U.S. Pat. No. 7,520,476 issued to Caveney et al. discloses a cable support system that includes a hanger plate securable to a structure, a chaining plate attachable to the hanger plate, and a cable support member attachable to the hanger plate or the chaining plate. The structure includes horizontally disposed saddles to allow the cables to rest in the saddle, but does not attach or otherwise secure the cables to the device. This support system is complicated by the need for special hanger plates, chaining plates, and saddles, all of which are non-standard items and unavailable at supply shops. Furthermore, this support system is limited to vertical disposition by virtue of its design, and thus lacks multi-directional versatility.

U.S. Pat. No. 5,587,555 issued to Rinderer discloses a device to be mounted on a support member for holding a conductor in a substantially fixed position extending generally parallel to the support member. The device includes a bracket having an arm with at least one opening therein and a clamp having a head and at least one leg projecting from the head adapted for reception in the opening in the arm. The leg of the clamp is movable in the opening in a first axial direction with respect to the leg so that the head of the clamp can be pushed closer to the arm to move the clamp to a clamping position in which the head of the clamp is in clamping engagement with a conductor disposed between the head and the arm. The device further includes a retainer for retaining the clamp in its clamping position. The retainer includes a structure on the arm for biting into the leg of the clamp when the clamp is pushed to its clamping position thereby to lock the clamp in its clamping position by inhibiting any movement of the head of the clamp away from the arm after the clamp has been moved to its clamping position. There is no clamp provided to secure the device to a building support member, thus the device must be welded to the member, or holes must be drilled in the member to fasten it thereto.

U.S. Pat. No. 5,564,659 issued to DeCapo discloses a conduit hanging apparatus for securing conduit to a support strut having upper, lower, and side surfaces including a conduit clip having two compressible members depending from a base portion where each compressible member is disposed on opposite sides of the conduit. Each compressible member has a lower end disposed opposite the base portion and a recess disposed between the lower end and the base portion where the recess is configured to engage and retain the conduit. A strut clamp secured around a portion of the upper and lower surfaces of the strut is arranged to support the conduit clip and the conduit. Thus, the device cannot be clamped to a single surface of a support strut, but must encircle the whole strut. A fastening means is provided for securing the base portion of the conduit clip to the strut clamp. Also included is a clamping mechanism operatively coupled to the lower end of each compressible member to draw the lower ends together such that the recess of each compressible member provides a frictional fit to retain the conduit disposed therebetween.

U.S. Patent Application Publication No. 2007/0235596 by Youmans discloses a conduit-positioning device that maintains conduit in fixed relation relative to an anchor member. The device comprises a member-attachment interface and a conduit spacer portion. The attachment interface spans one side of the web and must attach to both flanges of the I-beam type anchor member. The attachment interface also comprises a fastener-receiving bore and the conduit spacer portion comprises at least one conduit-receiving clamp. The fastener-receiving bore extends from an anterior attachment portion to a member-engaging portion. The conduit-receiving clamp positions at least one conduit unit by clamping the conduit unit as the device is anchored to an anchor member by way of the attachment interface.

As can be understood, all of the foregoing support systems, and other support systems currently in use, suffer from one or more limitations and/or disadvantages, such as excessive complexity, the 3-dimensional bulkiness of their design, lack of adaptability, and/or the need to drill holes into the I-beams or structural members to install them (drilling holes into I-beams is generally undesirable). Additionally, some of these support systems call for specialty components such as special brackets, special chaining plates, special saddles and other parts that may be costly and/or not readily available. Moreover, none of those support systems offer the installer flexibility and adaptability in regard to multi-directional disposition of the support system and versatility to accommodate a variety of installation needs. Likewise, should a need arise at a later time to install new conduits in addition to existing ones, none of the foregoing support systems offer the ability to readily and easily access and use void, unused spaces on I-beams or structural members, or the ability to readily and easily go under, over, between, or away from existing installations to install the additional support systems. In the latter cases, the installer would have to first disassemble previously installed support systems in order to carry out re-installation to accommodate the additional conduits, which is a time-consuming and tedious operation, resulting in increased costs and time delays.

Accordingly, there is a need to develop new, practical, simple, versatile, low-cost support devices and systems for quickly and inexpensively supporting and securing multiple conduits to structural members, wherein the new support devices and systems allow the use of unused void spaces on structural members and allow adding installations between, under, over or away from existing installations without the need to disassemble the existing installations.

SUMMARY

The present invention may comprise one or more of the features recited in the attached claims, and/or one or more of the following features and combinations thereof.

An illustrative embodiment of the invention includes a support device for supporting and securing utility conduits to building structural members, the support device comprising at least one clamping member and at least one elongate platform having spaced apart attachment points for securing the utility conduits. The at least one clamping member and the at least one elongate platform of the support device may be separate parts that are attachable to each other; or, the at least one clamping member and the at least one elongate platform of the support device may be integrally manufactured together to form a single body, i.e., to form a continuous and unitary member, hereinafter referred to as a single-bodied support device. It is to be understood that, as contemplated herein, the invention includes a support device comprising at least one clamping member and two or more elongate platforms. It is also to be understood that, as contemplated herein, the invention includes a support device comprising at least one elongate platform and two or more clamping members.

In another embodiment, the at least one clamping member includes a connecting member and a first and second arm projecting essentially in the same direction from opposite ends of the connecting member. Illustratively, the clamping member is in the shape of a C-clamp or an F-clamp, or other similar clamps known in the art, and the like. The clamping member may also include one or more through-holes, such as a through-hole in the connecting member, a through-hole in the second arm, or through-holes in both the connecting member and the second arm. These through-holes may be threaded or unthreaded. The clamping member also includes a fastener coupled to the clamping member's first arm so that a portion of the building structural member is clamped between the fastener and the clamping member's second arm. Illustrative examples of the fastener that is coupled to the clamping member's first arm are a screw-type fastener, a spring-type fastener, a manual toggle-type fastener, other similar fasteners known in the art, and the like.

In another embodiment, the spaced apart attachment points on the at least one elongate platform are a plurality of through-holes defined in the elongate platform. Illustratively, the spaced apart attachment points are threaded and/or unthreaded holes suitable for the attachment of conduit securing members.

In another embodiment, the at least one clamping member and the at least one elongate platform are coupled to each other by at least one fastener. Illustrative examples of the fastener that couples the at least one clamping member and the at least one elongate platform to each other is a screw-type fastener, other similar fasteners known in the art, and the like. Coupling of the at least one clamping member and the at least one elongate platform to each other by the fastener may be done via any of the through-holes in the at least one elongate platform and a through-hole in the clamping member's connecting member or a through-hole in the clamping member's second arm. It is to be understood that the at least one clamping member can be fastened at an end of the at least one elongate platform, or that the at least one clamping member can be fastened at any of the through-holes in between the two ends of the at least one elongate platform. It is further to be understood that, as contemplated herein, the at least one clamping member and the at least one elongate platform are attachable to each other in various orientations and at various angles relative to each other, i.e., at any of the possible angles. In one illustrative example, the connecting member is oriented perpendicular to the at least one elongate platform. In a second illustrative example, the second arm is oriented perpendicular to the at least one elongate platform.

In another embodiment of the invention, the at least one elongate platform of the device herein may optionally comprise either one or two u-channels having lips and the at least one clamping member is sized to fill a space defined between the lips. In one illustrative example, the at least one elongate platform is an elongated rectangular bracket or platform made of steel or another metallic or non-metallic material of suitable strength. It is to be understood that when the at least one elongate platform comprises one u-channel having lips, the clamping member may optionally be attached or fastened to the elongate platform in the u-channel between the lips, or the clamping member may optionally be attached or fastened to the elongate platform on the back side opposite the u-channel and lips.

It is to be understood that, as contemplated herein, when the at least one clamping member and the at least one elongate platform are integrally manufactured together to form a single-bodied support device, the clamping member's connecting member may be attached directly to the at least one elongate platform, or the clamping member's second arm may be attached directly to the at least one elongate platform. In one illustrative example, a portion of the at least one elongate platform defines the clamping member's connecting member. In a second illustrative example, a portion of the at least one elongate platform defines the clamping member's second arm. It is to be further understood that the at least one clamping member can be located at an end of the at least one elongate platform, or that the at least one clamping member can be located at any point in between the two ends of the at least one elongate platform. In one illustrative example, the at least one clamping member is located at the center of the at least one elongate platform. In a second illustrative example, the at least one clamping member is located at the end of the at least one elongate platform. It is further to be understood that the at least one clamping member can be attached directly to the at least one elongate platform at any of the possible angles.

In another embodiment of the invention, the device herein further comprises a singularity or plurality of conduit securing members coupled to the at least one elongate platform at the spaced apart attachment points. Illustrative examples of the conduit securing members are one-hole straps, two-hole straps, other similar conduit securing members known in the art, and the like.

Functionally, the support device herein can be pre-fitted at one or more of the attachment points of the at least one elongate platform with one or more conduit securing members such as one-hole or two-hole conduit straps, prior to being clamped via the fastener onto a structural member, for example, the flange of an I-beam. Alternatively, fitting the device with the one or more straps can be done after clamping the at least one clamping member of the device onto the structural member.

A principal object of the invention herein is to provide simple, practical, versatile, adaptable, low-cost conduit support devices and systems that possess significant advantages over existing systems, overcome the above problems, and allow for supporting and securing multiple conduits to structural members quickly and inexpensively.

It is another object of the present invention that those devices and systems can be readily used to install new conduits in addition to existing installations by making use of void, unused spaces on structural members.

It is another object of the present invention that those devices and systems can be readily used to install new conduits in addition to existing installations by readily fitting between, over, under, or away from the existing installations.

It is another object of the present invention that those devices and systems can be readily used to install new conduits in addition to existing installations without the need to disassemble and reassemble the existing installations.

It is another object of the present invention that those devices and systems possess versatility, adaptability and flexibility in regard to multi-directional disposition of the support system.

Additional features of the disclosure will become apparent to those skilled in the art upon consideration of the following detailed description of the illustrative embodiments.

BRIEF DESCRIPTION OF THE DRAWINGS

The detailed description particularly refers to the accompanying figures in which:

FIG. 1A and FIG. 1B are a front view and a side view, respectively, of a beam clamping member.

FIG. 2A is a perspective view of a first elongate platform having spaced apart holes for conduit clamps.

FIG. 7A is a perspective side view of an illustrative single-bodied support device wherein the elongate platform defines the connecting member of the clamping member;

FIG. 7B is a back view of the support device of FIG. 6;

DESCRIPTION OF THE ILLUSTRATIVE EMBODIMENTS

Figure 2B:
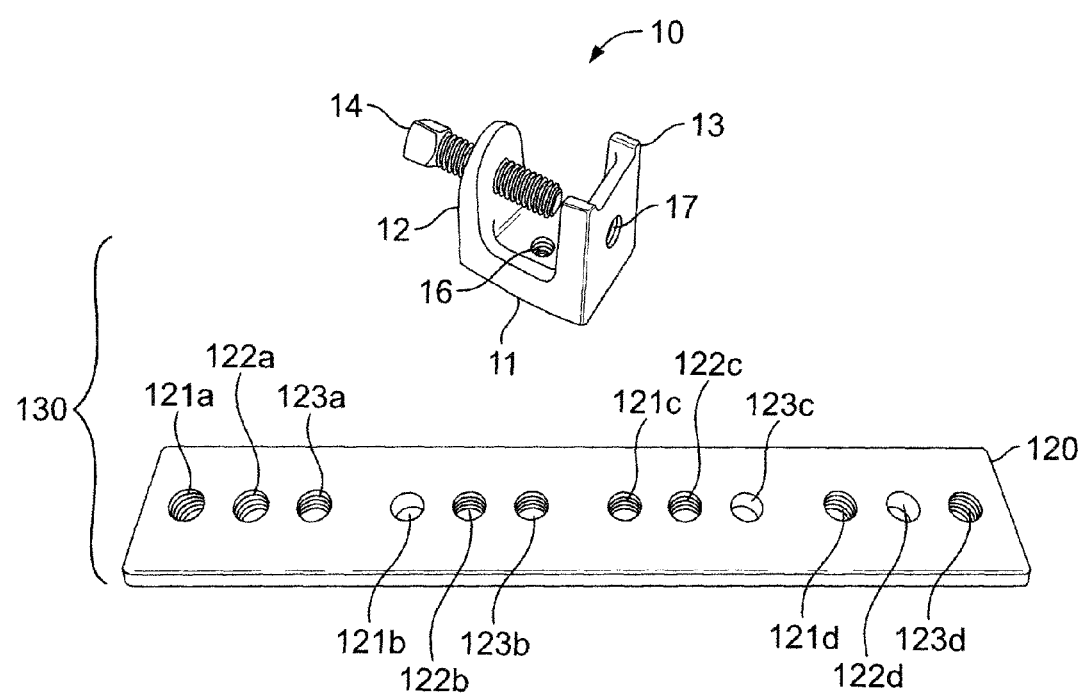
FIG. 2B is a perspective view of the beaming clamping member of FIG. 1 and a second illustrative elongate platform having spaced apart holes for conduit clamps.
Figure 3A:
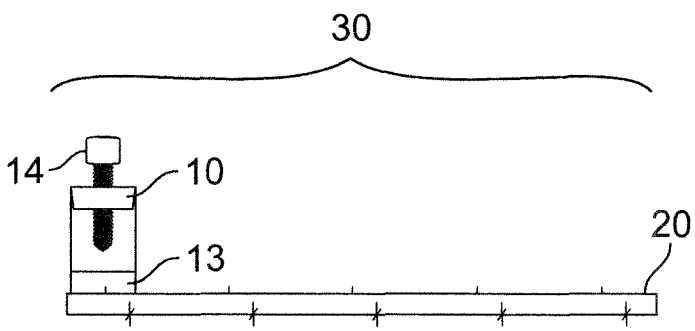
FIGS. 3A-3E are side views of a beam clamp as in FIG. 1 and a rectangular platform as in FIG. 2A or 2B attached together in alternative relative positions, and with the jaw of the beam clamp oriented perpendicular to the length of the rectangular platform.
Figure 3B:
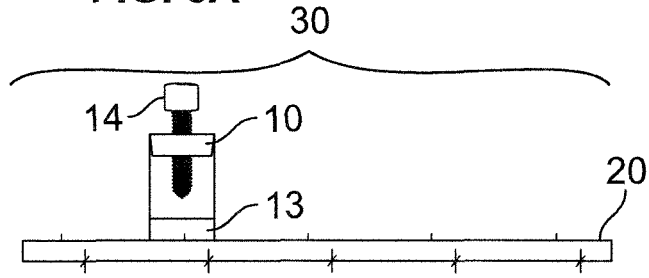
Figure 3C:
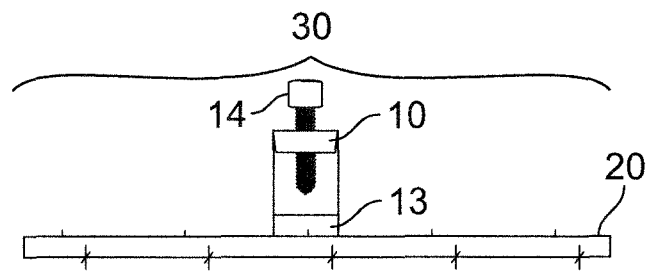
Figure 3D:
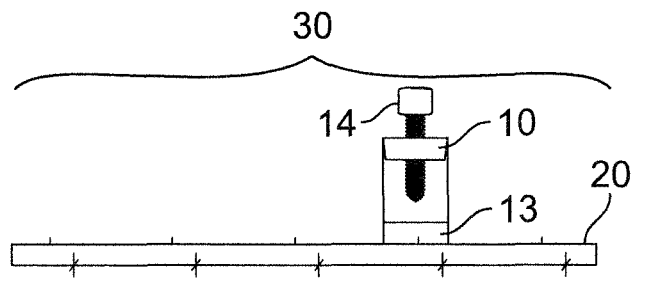
Figure 3E:
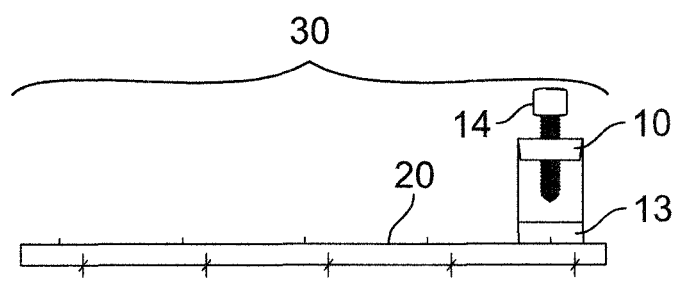
Figure 4A:
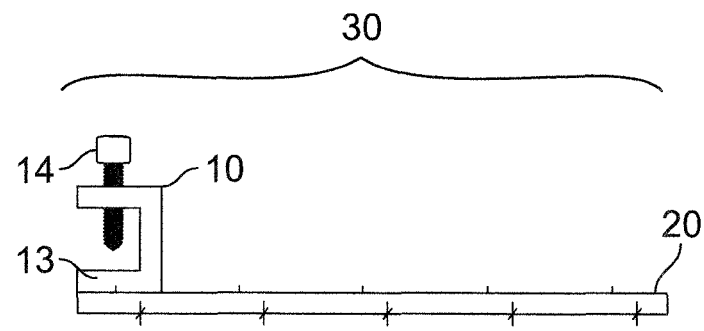
FIGS. 4A-4E are side views of a beam clamp as in FIG. 1 and a rectangular platform as in FIG. 2A or 2B attached together in alternative relative positions, and with the jaw of the beam clamp oriented along the length of the rectangular platform.
Figure 4B:
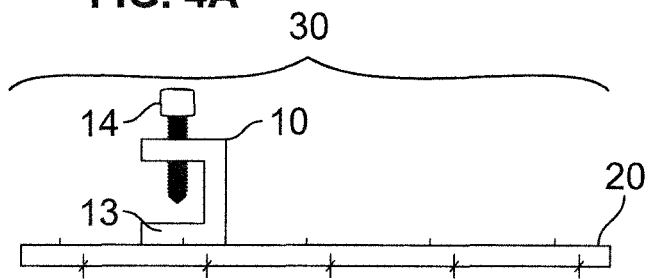
Figure 4C:
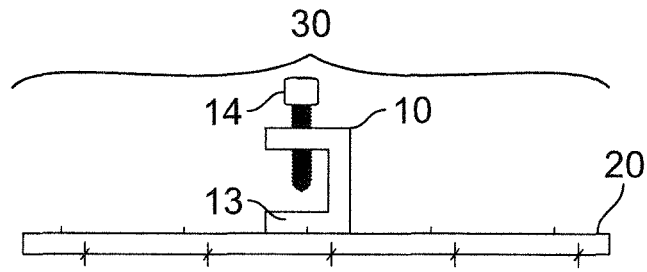
Figure 4D:
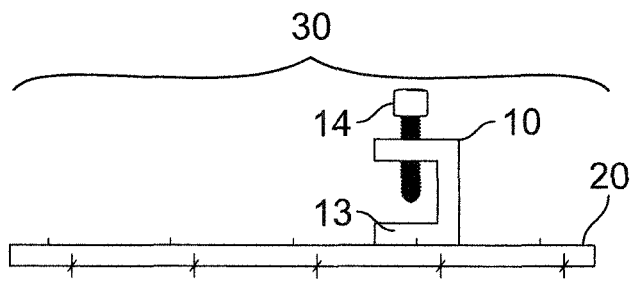
Figure 4E:
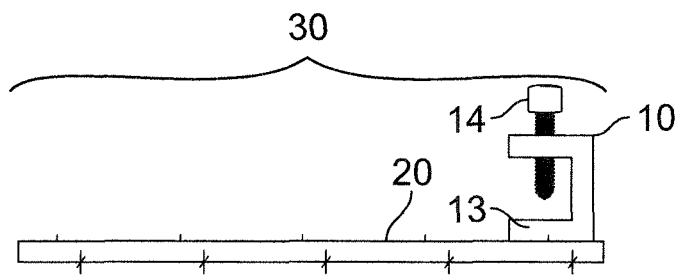
Figure 5A:
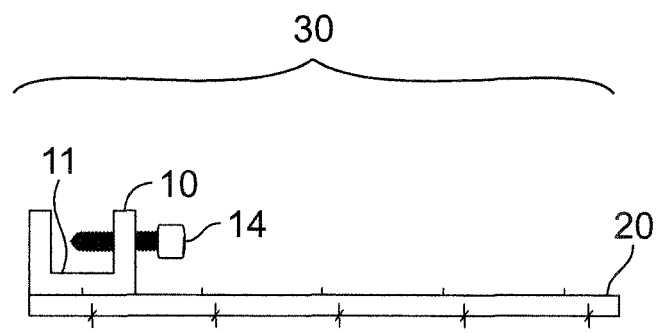
FIGS. 5A-5E are side views of a beam clamp as in FIG. 1 and a rectangular platform as in FIG. 2A or 2B attached together in alternative relative positions, and with the jaw of the beam clamp oriented perpendicular relative to the length of the rectangular platform.
Figure 5B:
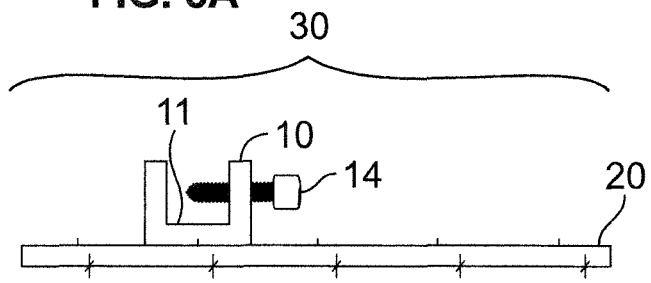
Figure 5C:
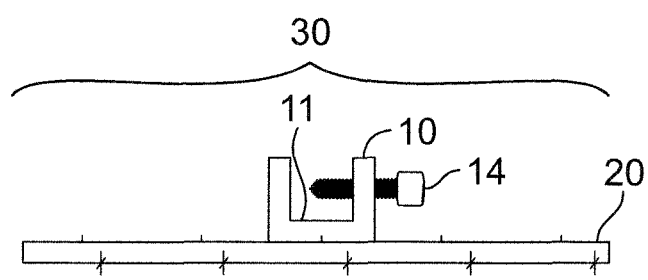
Figure 5D:
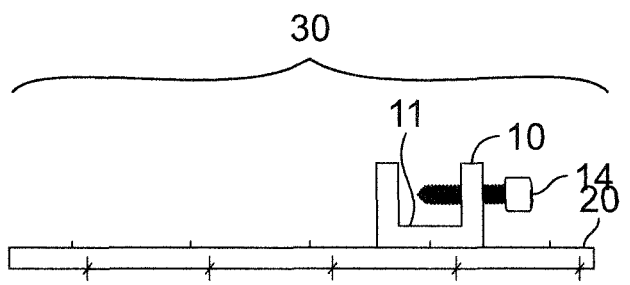
Figure 5E:
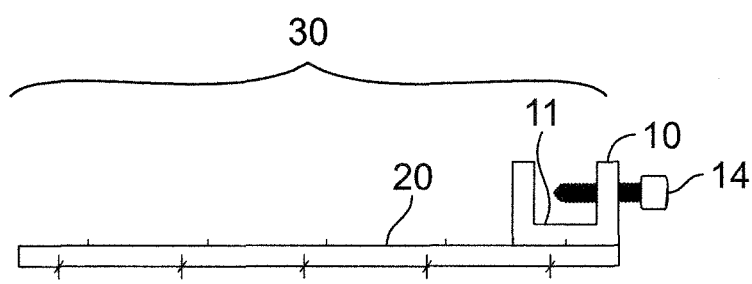

For the purposes of promoting and understanding the principals of the invention, reference will now be made to one or more illustrative embodiments illustrated in the drawings, and specific language will be used to describe the same.

Referring to FIG. 1 of the drawings, as described in the Brief Description of the Drawings section above, FIG. 1 depicts a clamping member 10 of the invention herein comprising a connecting member 11, a first arm 12 and a second arm 13, wherein first arm 12 and second arm 13 project in essentially the same direction from opposite ends of connecting member 11, such that connecting member 11 and arms 12 and 13 together form a jaw. Clamping member 10 also comprises a fastener 14 coupled into first arm 12 via a through-hole 15 in first arm 12. In the illustrative embodiment, fastener 14 is a screw-type fastener and through-hole 15 is a threaded through-hole. Additionally, clamping member 10 may optionally comprise one through-hole 16 in connecting member 11 and/or one through-hole 17 in second arm 13. Through-holes 16 and 17 may be threaded or unthreaded. In the illustrative embodiment, clamping member 10 comprises both through-holes 16 and 17, both of which are threaded. Illustrative examples of clamping member 10 include clamping devices commonly known in the art as a beam clamp, a C-clamp, an F-clamp, and the like, which are typically manufactured of materials of suitable strength such as various metallic or non-metallic materials, for example, zinc-plated steel or other alloy.

Referring to FIG. 2A of the drawings, this figure depicts an elongated rectangular platform 20 of the invention, referred to herein interchangeably by the terms platform 20 or elongate platform 20. Platform 20 comprises a multiplicity of spaced apart connections, which in the illustrative embodiment are a unthreaded through-holes 21a-e and threaded through-holes 22a-e. For the sake of illustration, platform 20 as depicted in FIG. 2A is shown to have five spaced apart sets of connections, each set including one unthreaded through-holes 21a-e and one threaded through-holes 22a-e. It is understood that the number of sets of connections, and the number of connections within each set may each be larger or smaller than the illustrated embodiment. It is also understood that, as contemplated herein, platform 20 can alternatively include only a set of unthreaded through-holes 21 and no set of threaded through-holes 22; or platform 20 can alternatively include only a set of threaded through-holes 22 and no set of threaded through-holes 21. Platform 20 may also optionally comprise lips 23 on the edges of platform 20 defining a u-channel 24.

As depicted in FIG. 2A, platform 20 is shown to have a single u-channel defined between one set of lips 23 on the platform's bottom side. It is understood that, as contemplated herein, platform 20 may optionally comprise two u-channels defined between two sets of lips 23, with one of the u-channels being on the platform's bottom side (shown in FIG. 2A) and another u-channel being on the platform's top side (not shown in FIG. 2A). Additionally, in the case that platform 20 does not include a u-channel, it is contemplated herein that platform 20 can optionally include one or more notches, e.g., recessed areas or protrusions (not shown in FIG. 2A), on one or both of its sides. Likewise, in the case that platform 20 does include a u-channel, it is contemplated herein that platform 20 can optionally include one or more notches on side opposite the u-channel. Such notches would be useful if limiting the positioning and/or orientation of clamping members (see below) is desirable.

Referring to FIG. 2B of the drawings, an alternative illustrative embodiment of a elongated rectangular platform 120 is shown. Platform 120 comprises a multiplicity of spaced apart connections, which in the illustrative embodiment are a through-holes 121a-d, 122a-d, and 123a-d, including threaded holes 121a, 122a, 123a, 122b, 123b, 121c, 122c, 121d, and 123d, for example, for coupling conduit clamps 140 (as shown in FIGS. 6A-6C) which typically have a through-hole, and including unthreaded holes 121b, 123c, and 122d, for example, for coupling a clamping member 10, which typically have threaded holes 16 and 17, or for the combination of a clamping member 10 on one side of platform 120 and a conduit clamp 140 (or other utility conduit securing member) on the other side of platform 120, with the same unthreaded hole, for example hole 122d as shown in FIG. 6A, used to couple both to the platform 120.

For the sake of illustration, platform 120 as depicted in FIG. 2B is shown to have four spaced apart sets of connections, each of three sets including at least one unthreaded through-holes 121b, 123c, and 122d and two threaded through-holes 122b, 123b, 121c, 122c, 121d, and 123d, and the fourth set having three threaded through-holes 121a, 122a, 123a. It is understood that the number of sets of connections, and the number of connections within each set may each be larger or smaller than the illustrated embodiment, and the combination of threaded holes, unthreaded holes, or other types of connections can varied as desired.

In the illustrative embodiment, platform 120 includes four sets (a-d) of holes, each set uniformly spaced apart, for example, about 0.75 inches, and each set having an equal number, three, of uniformly spaced holes, for example, about 0.5 inches. This spacing accommodates space for at least up to 1.0 inch standard conduit clamps such as those shown in FIGS. 6A-6C.

Figure 6A:
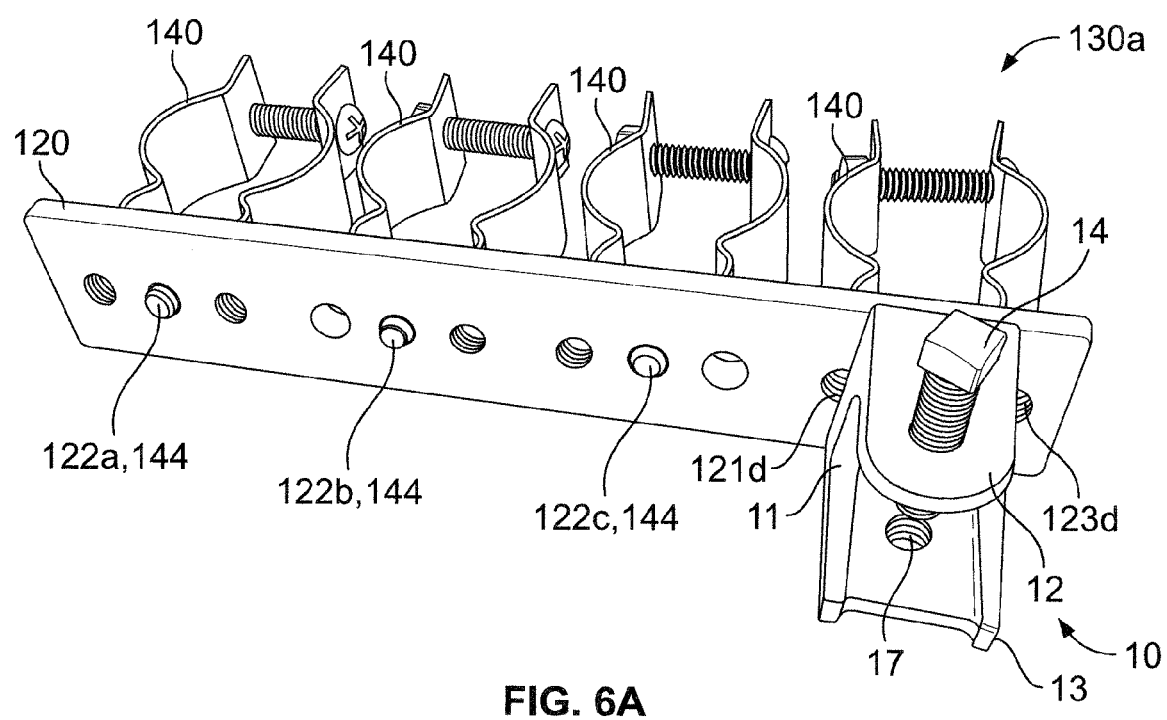
FIG. 6A-6C are perspective views of a beam clamp as in FIG. 1, a rectangular platform as in FIG. 2B, and conduit clamps, attached together in alternative relative positions and alternative ones of each set of connection holes in the platform.
Figure 6B:
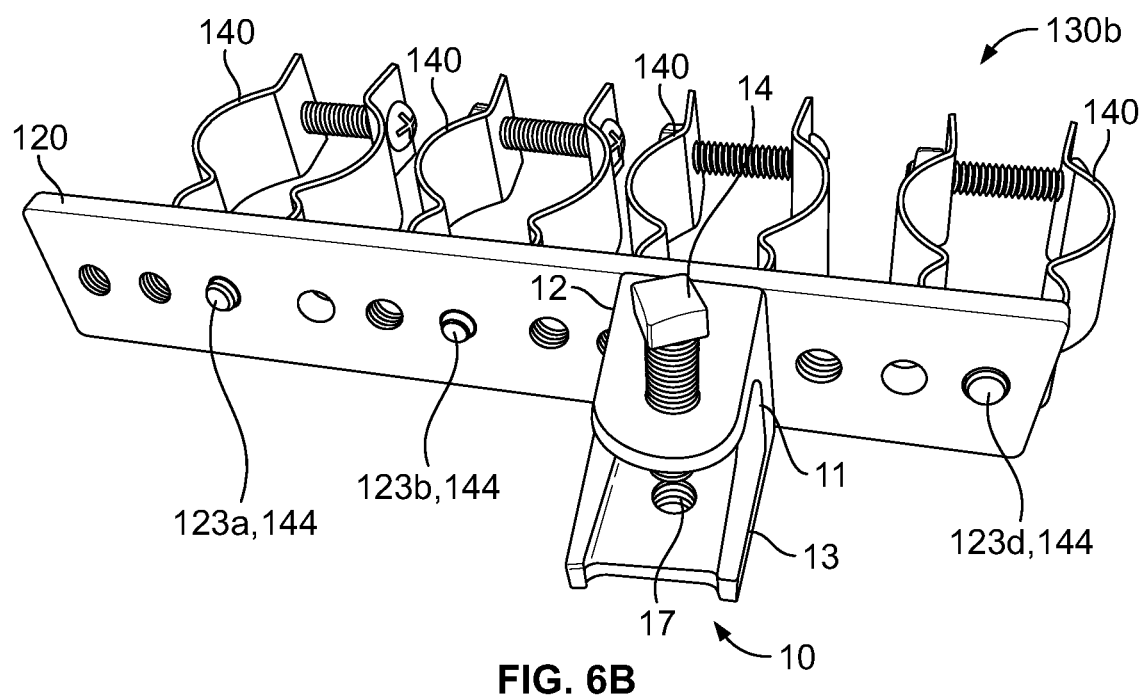
Figure 6C:
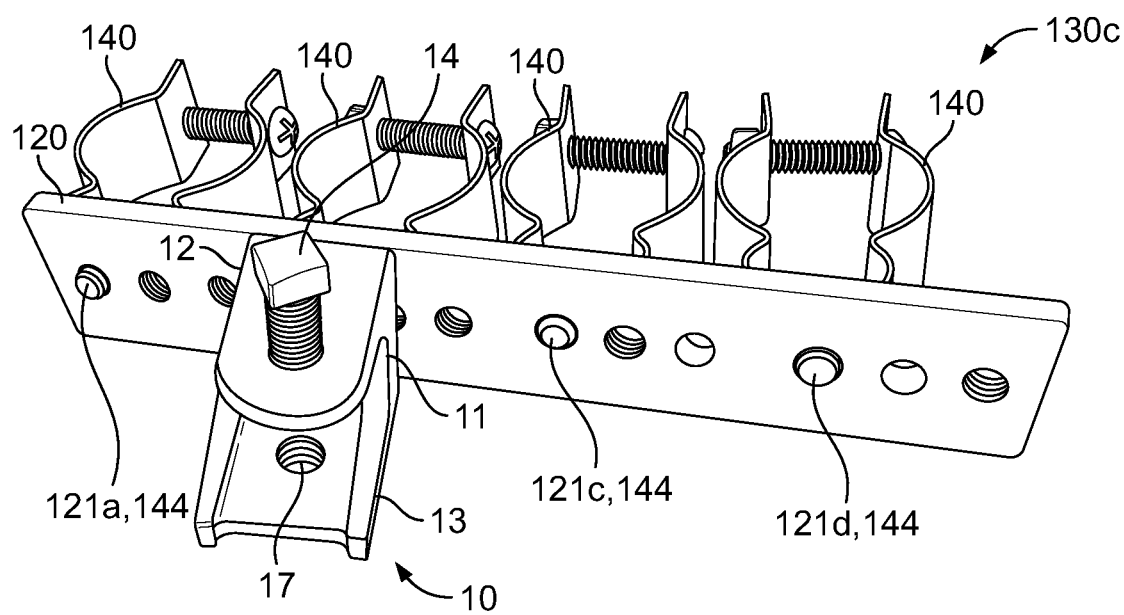

Referring to FIGS. 2B and 6A-6C, a number of different arrangements of clamping member 10 and conduit clamps 140 can be used with the platform 120. For example, as shown in FIG. 6A, in the rightmost set d, the center hole 122d (FIG. 2B) is unthreaded and can be used for coupling a clamping member 10 and conduit clamp 140, and the center holes 122a-c in the remaining three sets, can be used for coupling on equal spacing other conduit clamps 140, on one or both sides of the platform 120. Similarly, as shown in FIG. 6B, in the right of center set c, the right hole 123c (FIG. 2B) is unthreaded and can be used for coupling a clamping member 10 and conduit clamp 140, and the right holes 123a, 123b, and 123d in the remaining three sets, can be used for coupling on equal spacing other conduit clamps 140, on one or both sides of the platform 120. Also similarly, as shown in FIG. 6C, in the left of center set b, the left hole 121b is unthreaded and can be used for coupling a clamping member 10 and conduit clamp 140, and the center holes 121a, 121c, and 121d in the remaining three sets, can be used for coupling on equal spacing other conduit clamps 140, on one or both sides of the platform 120.

In an alternative embodiment, the spacing and characteristics of sets of connections, including for example, threaded or unthreaded holes, can be provided so that depending on the size of conduit clamps or other utility conduit securing member used, different intervals of holes can be used. For example, for a small conduit clamp, every $3^{rd}$ hole can be used for coupling a clamp to platform 120, for a medium conduit clamp, every $4^{th}$ hole can be used, and for a large conduit clamp, every $5^{th}$ hole can be used.

In another embodiment of the invention, a support device 30 (FIG. 3) of the invention is made by coupling together a clamping member 10 and an elongate platform 20. Coupling of the clamping member 10 and elongate platform 20 is done via either of the threaded through-holes in the clamping member 10 and any of the unthreaded through-holes in the elongate platform 20. A fastener is used to couple clamping member 10 and elongate platform 20. Illustratively, the fastener can be a screw-type fastener of an appropriate size suitable for the through-holes in the clamping member and the elongate platform. Alternatively, the fastener may be of another type known in the art, for example, rivets, welds, glues, and the like. In one aspect, the elongate platform 20 does not include a u-channel, and the clamping member 10 may be coupled to the elongate platform 20 on either side of the elongate platform. In another aspect, the elongate platform 20 includes a u-channel as described above, and the clamping member 10 is coupled to the elongate platform 20 on the back side opposite the u-channel. In another aspect, the elongate platform 20 includes a u-channel as described above, the clamping member 10 is sized to fit into the u-channel, and the clamping member 10 is coupled to the elongate platform 20 by positioning the clamping member's connecting member 11 or second arm 13 in the u-channel. It is understood that one purpose of the u-channel is to prevent relative rotation or twisting about the axis of the fastener.

It is also understood that more than one clamping member 10 can be coupled to elongate platform 20, depending on the number of clamping members 10 needed for a particular installation. Thus, illustratively, two or more clamping members 10 may be coupled to elongate platform 20. In the latter case, the clamping members 10 may be fastened on the same side of elongate platform 20, or one or more clamping members 10 may be fastened on one side of elongate platform 20, and one or more clamping members 10 may be fastened on the other side of elongate platform 20.

FIGS. 3A-3E show five illustrative alternative arrangements of support device 30 of the invention, wherein a clamping member 10 represented by a standard beam clamp as in FIG. 1 is coupled via a through-hole 17 (not shown) in its second arm 13 (i.e., the beam clamp's bottom) to an elongate platform 20 represented by a platform as in FIG. 2A alternatively at the five unthreaded through holes 21 (not shown) in the platform, using a threaded screw fastener (not shown). As depicted in FIGS. 3A-3E, the beam clamp's jaw is oriented perpendicular to the length of platform 20. It is understood that the beam clamp can be rotated 360 degrees about its second arm 13 (i.e., the beam clamp's bottom side) to any desired angle relative to the length of platform 20, prior to tightening the threaded screw fastener. It is also understood that platform 20 can comprise greater or fewer than five through-holes for coupling with the beam clamp. It is also understood that more than one beam clamp may be coupled to platform 20.

FIGS. 4A-4E show five illustrative arrangements of a support device 30 of the invention, wherein a clamping member 10 represented by a standard beam clamp as in FIG. 1 is coupled via a through-hole 17 (not shown) in its second arm 13 (i.e., the beam clamp's bottom) to an elongate platform 20 represented by a rectangular member as in FIG. 2A alternatively at the five unthreaded through holes 21 (not shown) in the platform, using a threaded screw fastener (not shown). As depicted in FIGS. 4A-4E, the beam clamp's jaw is oriented parallel to the length of the platform. It is also understood that platform 20 can comprise greater or fewer than five through-holes for coupling with the beam clamp. It is also understood that more than one beam clamp may be coupled to platform 20.

FIGS. 5A-5E show five illustrative arrangements of a support device 30 of the invention, wherein a clamping member 10 represented by a standard beam clamp as in FIG. 1 is coupled via a through-hole 16 (not shown) in its connecting member 11 (i.e., the beam clamp's back) to an elongate platform 20 represented by a platform as in FIG. 2A alternatively at the five unthreaded through holes 21 (not shown) in the platform, using a threaded screw fastener (not shown). As depicted in FIGS. 5A-5E, the beam clamp's jaw is oriented perpendicular relative to the length of the platform. It is also understood that platform 20 can comprise greater or fewer than five through-holes for coupling with the beam clamp. It is also understood that more than one beam clamp may be coupled to platform 20.

In another alternative embodiment of the support devices of the invention herein, the clamping member and the elongate platform of the support device may be integrally manufactured together to form a single body, i.e., to form a continuous and unitary member, referred to herein as a single-bodied support device. FIG. 7A and FIG. 7B depict a side view and a back view, respectively, of an illustrative embodiment of a single-bodied support device 40. Support device 40 comprises a clamping member 50 that includes a screw-type fastener 54 coupled into the clamping member 50. Support device 40 also comprises an elongate platform 60 that includes three spaced apart through-holes 61, which may independently be threaded or unthreaded. A portion of the elongate platform 60 defines the connecting member 51 of the clamping member 50. The two arms 52 and 53 form the jaw of the clamping member 50 and are oriented perpendicular to the length of the elongate platform 60.

While as depicted in FIG. 7A the clamping member 50 of the support device 40 is located at one end of the elongate platform 60, it is to be understood that the clamping member 50 may alternatively be located anywhere in between the two ends of the elongate platform 60. It should also be understood that the elongate platform 60 of this support device may include greater or fewer than three through-holes 61 or other types of connections. It should also be understood that, as contemplated herein, similar single-bodied support devices may be manufactured to include one elongate platform 60 and two clamping members 50. In the latter case, the jaws of the two clamping members 50 can be oriented in the same direction, or the jaws of the two clamping members 50 can be oriented not in the same direction. It should also be understood that the conduit clamping members 140 may optionally be integrally formed with the platform 60.

Figure 8:
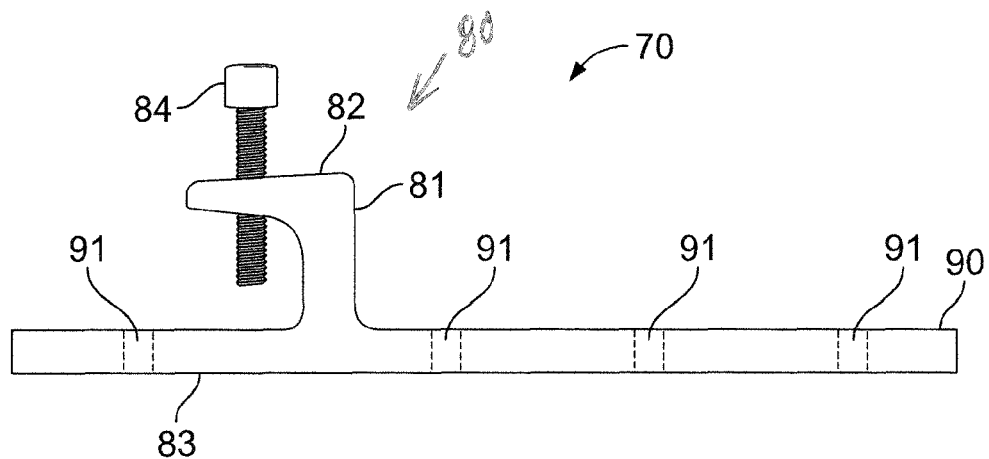
FIG. 8 is a side view of an illustrative single-bodied support device wherein the elongate platform defines the second arm of the clamping member and the jaw of the clamping member is oriented outward relative to the length of the elongate platform.

FIG. 8 depicts a side view of another illustrative embodiment of a single-bodied support device 70, comprising a clamping member 80 that includes a screw-type fastener 84 coupled into clamping member 80, also comprising an elongate platform 90 that includes four spaced apart through-holes 91. The through-holes 91 may independently be threaded or unthreaded. A portion of the elongate platform 90 defines the second arm 83 of the clamping member 80. The jaw 82 of the clamping member 80 is oriented parallel and facing outward relative to the length of the elongate platform 90 and is coupled to the elongate platform 90 by connecting member 81. While as depicted in FIG. 8 the clamping member 80 of the support device 70 is located at one end of the elongate platform 90, it is to be understood that the clamping member 80 may alternatively be located anywhere in between the two ends of the elongate platform 90.

Figure 9:
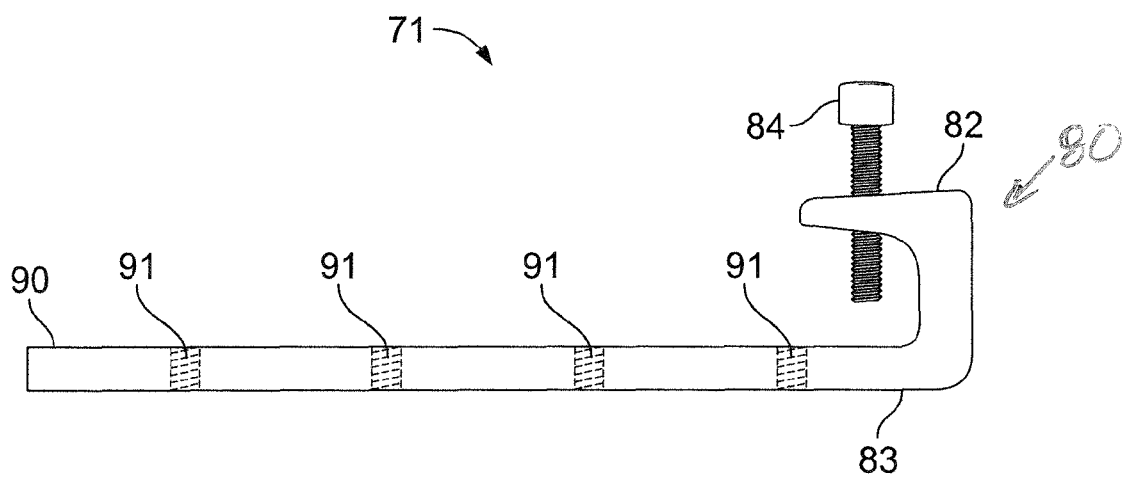
FIG. 9 is a side view of an illustrative single-bodied support device wherein the elongate platform defines the second arm of the clamping member and the jaw of the clamping member is oriented inward relative to the length of the elongate platform.

For example, FIG. 9 depicts a support device 70 wherein the clamping member 80 is located at the opposite end of elongate platform 90, and is oriented parallel and facing inward relative to the length of the elongate platform 90. It should also be understood that the elongate platform 90 of this support device may include greater or fewer than four through-holes 91. It should also be understood that, as contemplated herein, similar single-bodied support devices may be manufactured to include one elongate platform 90 and two clamping members 80. In the latter case, the jaws of the two clamping members 80 can be oriented in the same direction, or the jaws of the two clamping members 80 can be oriented not in the same direction.

Figure 10:
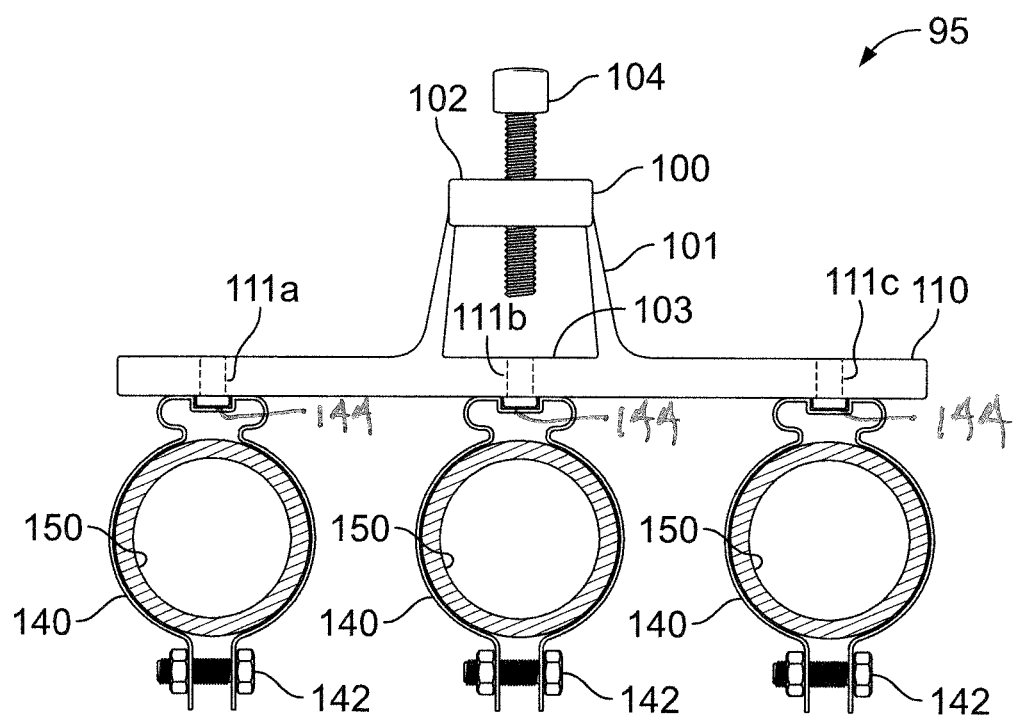
FIG. 10 is a front view of an illustrative single-bodied support device and conduit clamps wherein the clamping member is located at the center of the elongate platform and the jaw of the clamping member is perpendicular to the elongate platform.

FIG. 10 depicts a front view of another illustrative embodiment of a single-bodied support device 95, comprising a clamping member 100 that includes a screw-type fastener 104 coupled to arm 102 of clamping member 100, also comprising an elongate platform 110 that includes three spaced apart through-holes 111. The through-holes may independently be threaded or unthreaded. A portion of the elongate platform 110 defines the second arm 103 of the clamping member 100. A connecting member 101 and arm 102 form a jaw of the clamping member 100 that oriented perpendicular relative to the length of the elongate platform 110. While as depicted in FIG. 10 the clamping member 100 of the support device 95 is located at a mid-point of the elongate platform 110, it is to be understood that the clamping member 100 may alternatively be located anywhere at or in between the two ends of the elongate platform 110. It should also be understood that the elongate platform 110 of this support device may include greater or fewer than three through-holes 111. It should also be understood that, as contemplated herein, similar single-bodied support devices may be manufactured to include one elongate platform 110 and a multiplicity of clamping members 100, such as, for example, two clamping members 100. In the latter case, the jaws of the two clamping members 100 can be oriented in the same direction, or the jaws of the two clamping members 100 can be oriented not in the same direction.

It is further to be understood that, in all of the single-bodied support devices described in the above embodiments, wherein a portion of the elongate platform defines either the clamping member's connecting member or the clamping member's second arm, the jaw of the clamping member can be oriented at any of the other possible angles relative to the length of the elongate platform.

In a further embodiment of the invention herein, the support devices embodied as described in any of the preceding paragraphs may be fitted with one or more conduit securing members, illustratively one or more one-hole straps, one or more two-hole straps, other similar conduit securing members known in the art, and the like. Standard conduit securing members typically include an additional through-hole, for example, in their back sides. The conduit securing members can be attached to the support devices, using fasteners such as screw-type fasteners, e.g., via the through-holes in the backs of the conduit securing members and any of the through-holes in the support devices' elongate platforms. Solely for the sake of illustration, referring again to FIG. 10, this figure shows a single-bodied support device 95 to which three conduit securing members 140 are attached. Specifically, the securing members 140 are conduit clamps that are coupled to the elongate platform 110 at the spaced apart through-holes 111 by fasteners 144. In each of the securing members 140 is secured a utility conduit 150, and each of the conduit securing members 140 includes a fastener 142 that closes to member 140 securing the conduit 150.

Figure 11:
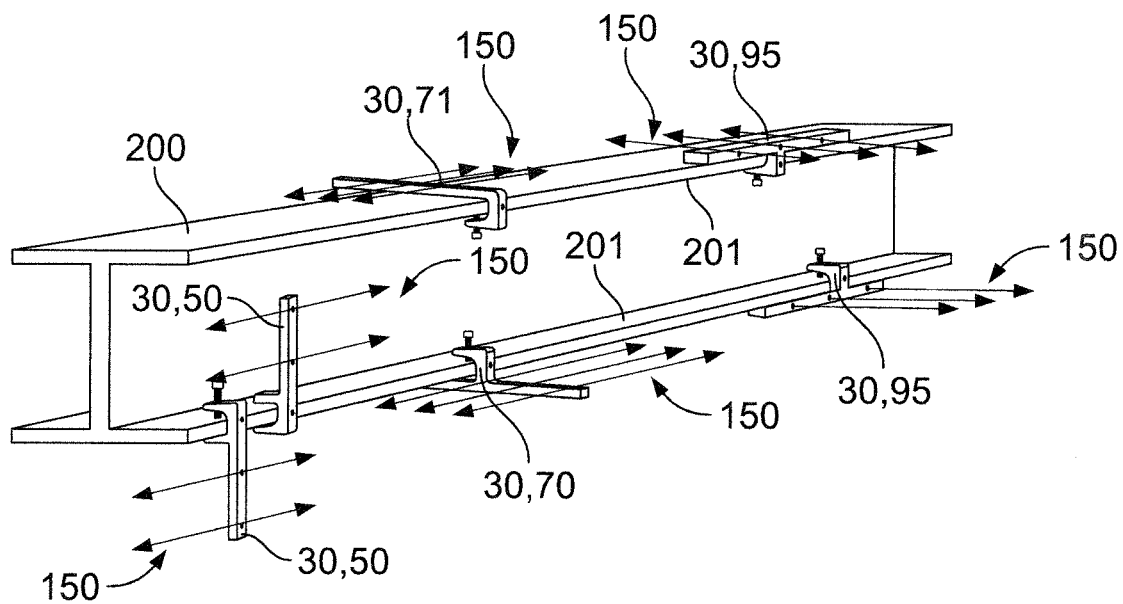
FIG. 11 is a perspective view showing various illustrative embodiments of support devices of the present invention, secured to flanges of an I-beam in alternative relative locations.

FIG. 11 shows a perspective view illustrating support devices 30, 50, 70, 95 secured to a standard I-beam 200 at the I-beam's flanges 201. FIG. 11 exemplifies a few of the numerous possible arrangements for support devices according to the invention. The arrowed lines in FIG. 11 represent partial sections of conduits, and illustrate how the invention herein allows for installing gangs of conduits in a multiplicity of directions and locations, including hanging off the I-beam flanges' edges, downward, upward, inward, outward, and over the unused, void spaces of the I-beam. It is to be understood that this figure is not intended to limit the invention in any way, but only to illustrate a few of the great variety of possible support devices contemplated as part of the invention herein.

Figure 12:
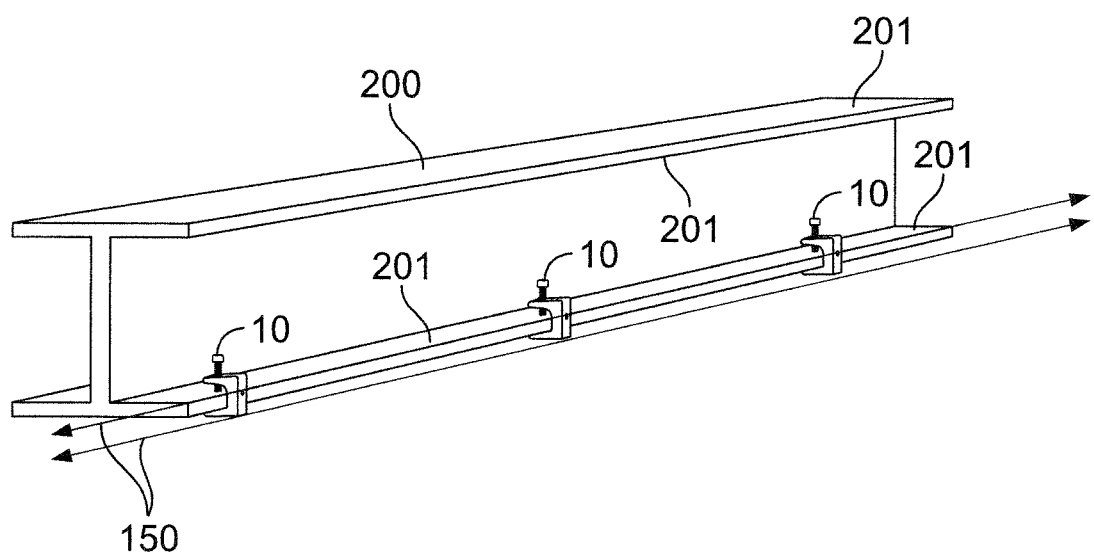
FIG. 12 is a perspective view showing a typical prior art example of conduits secured to the flange of an I-beam using only beam clamps and conduit clamps

In contrast, FIG. 12 shows a perspective view exemplifying the common method currently used in the art to secure utility conduits 150 (represented by arrowed lines) to an I-beam 200 at the I-beam's flanges 201, using only a standard beam clamp 10 and conduit securing members (not shown), for example, such as the type of securing member 140 shown in FIG. 10. As illustrated in the FIG. 12, the common method currently used in the art suffers from great limitations, such as in regard to the number of conduits that can be secured and the limited positions and directions in which the conduits can be installed.

The support devices of the invention herein can be manufactured from standard materials used in the art that possess suitable strength, rigidity and other characteristics appropriate for conduit support devices. Illustrative materials are various metallic materials such as steel, iron, and aluminum, which can optionally be coated, galvanized or electro-plated with other metals; as well as suitable non-metallic materials, e.g., various composites of appropriate strength. For example, the support devices can be formed from zinc-plated steel or other alloys.

Figure 13:
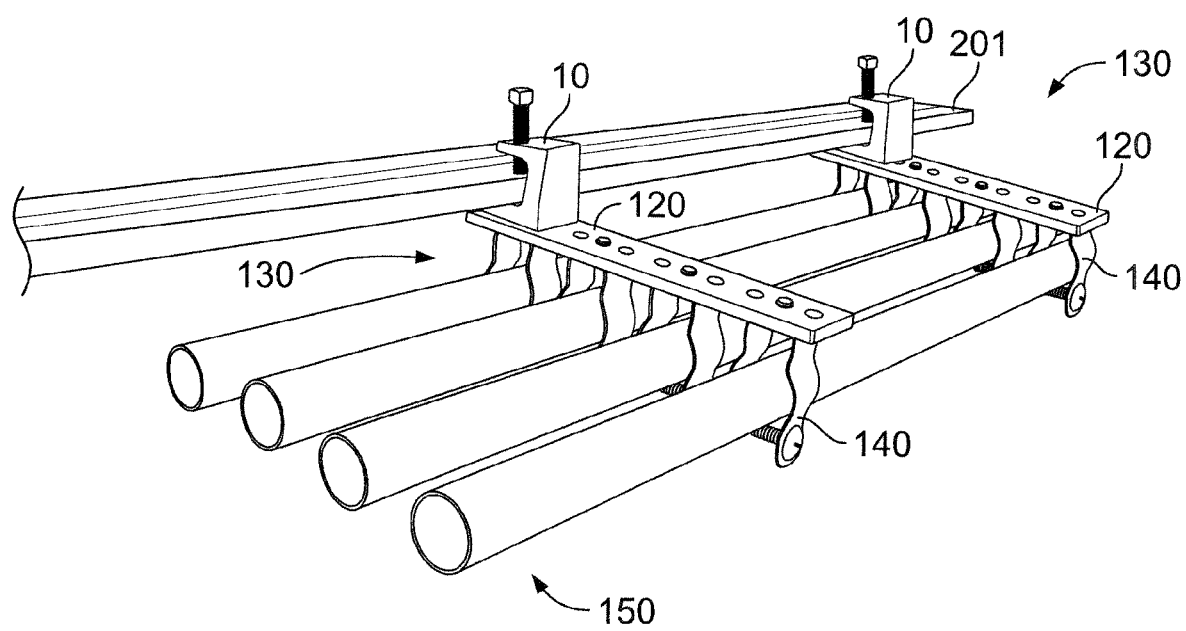
FIG. 13 is a perspective view showing an illustrative embodiment of the support system of the present invention, secured to the flange of an I-beam in a first location and location, with a single gang of conduits clamped on one side of the elongate platform.
Figure 14:
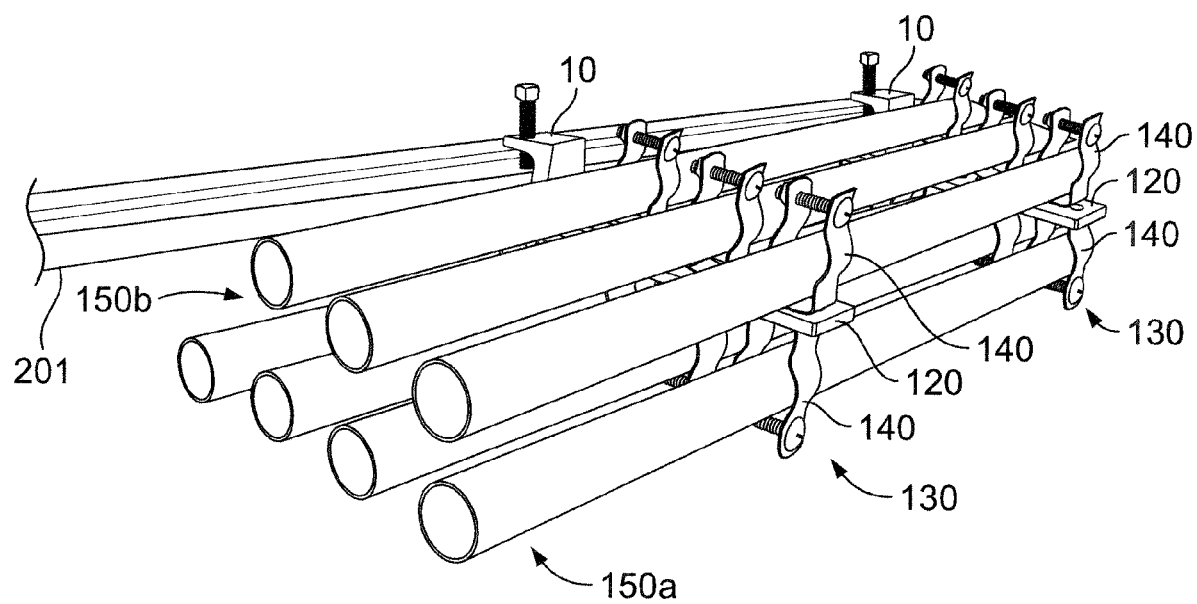
FIG. 14 is a perspective view showing an illustrative embodiment of the support system of the present invention, secured to the flange of an I-beam in a first location and location, with a gang of conduits clamped on each side of the elongate platform.
Figure 15:
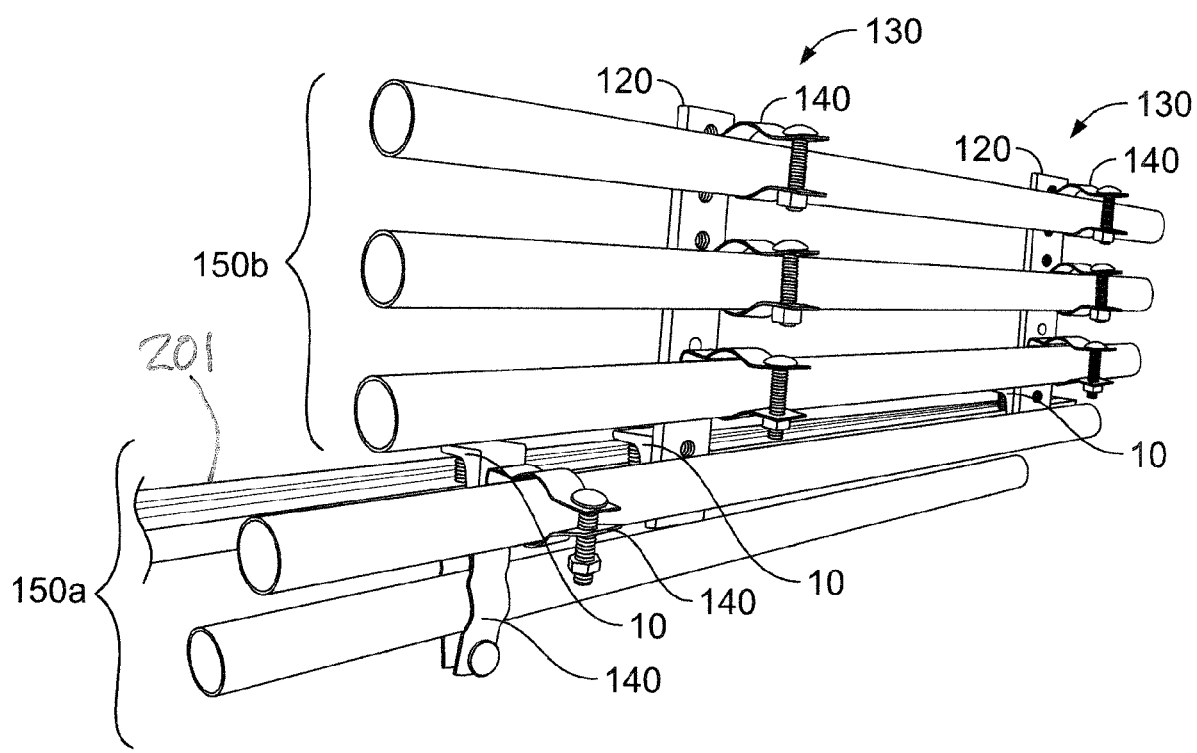
FIG. 15 is a perspective view showing an illustrative embodiment of the support system of the present invention, supporting a single gang of conduits clamped on one side of the elongate platform, and secured to the flange of an I-beam in a first location and location compatible with a preexisting gang of conduits attached to the I-beam with only beam clamps and conduit clamps.

Referring to FIGS. 13-15, illustrative embodiments of support systems of the present invention are illustrated. In FIG. 13, a support system includes two support devices 130, both supporting a gang of conduits 150. Each support device 130 includes a horizontally oriented elongate platform 120 extending outward from the flange 201, a clamping member 10 coupling the support device 130 to a flange 201, and four conduit clamps 140, each clamp supporting one of the conduits on a lower side of the elongate platform 120. In FIG. 14, a support system includes two support devices 130, both supporting a lower gang of four conduits 150a and an upper gang of three conduits 150b. Each support device 130 includes a horizontally oriented elongate platform 120 extending outward from the flange 201, a clamping member 10 coupling the support device 130 to a flange 201, and seven conduit clamps 140, each clamp supporting one of the conduits on the elongate platform 120.

In FIG. 15, a support system includes two support devices 130, both supporting a gang of conduits 150b. Each support device 130 includes a vertically oriented elongate platform 120 extending upwardly from the flange 201, a clamping member 10 coupling the support device 130 to a flange 201, and three conduit clamps 140, each clamp supporting one of the conduits on an outer side of the elongate platform 120. FIG. 15 also illustrates the use of the present invention to add the gang of conduits 150b in an otherwise inaccessible space and relative to existing gang of conduits 150a that are coupled to the flange 201 with a prior art beam clamp 10 and conduit clamps 140.

Referring to FIG. 15, an illustrative embodiment of a method of supporting and securing utility conduits to a building structural member according to the present invention includes at least one of the following steps, in the below or an alternative order. Selecting a location for the utility conduits relative to the building structural member. Determining a desired orientation and location for a planar elongate platform so that the utility conduits can be supported and secured in the selected location, including ensuring the utility conduits and the elongate platform and clamping member will be clear of preexisting utility conduits. In order to provide the desired orientation and location, selecting one of a connecting member and second arm of a clamping member having a connecting member and a first and second arm projecting from opposite ends of a first side of the connecting member, selecting one of a plurality of spaced apart connections of a planar elongate platform, and coupling the clamping member to the planar elongate platform with selected one of the connecting member and the second arm coupled to the selected one of the plurality of spaced apart connections. Coupling utility conduit securing members to selected ones of the plurality of spaced apart connections. Clamping the clamping member to a building structural member.

Figure 16A:
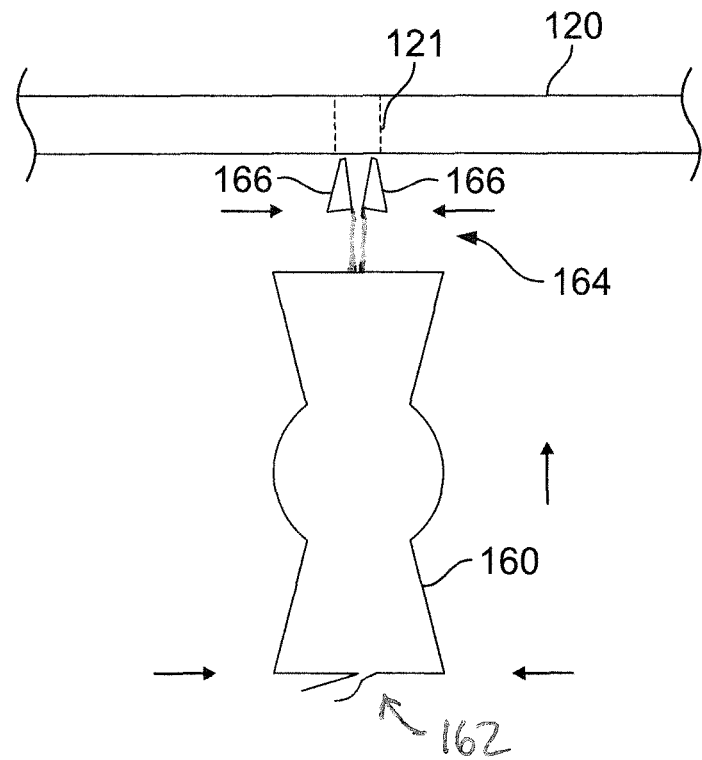
FIGS. 16A and 16B is a side unassembled view and a side assembled view, respectively, of an illustrative embodiment of a conduit clamp and an elongate platform according to the present inventions.
Figure 16B:
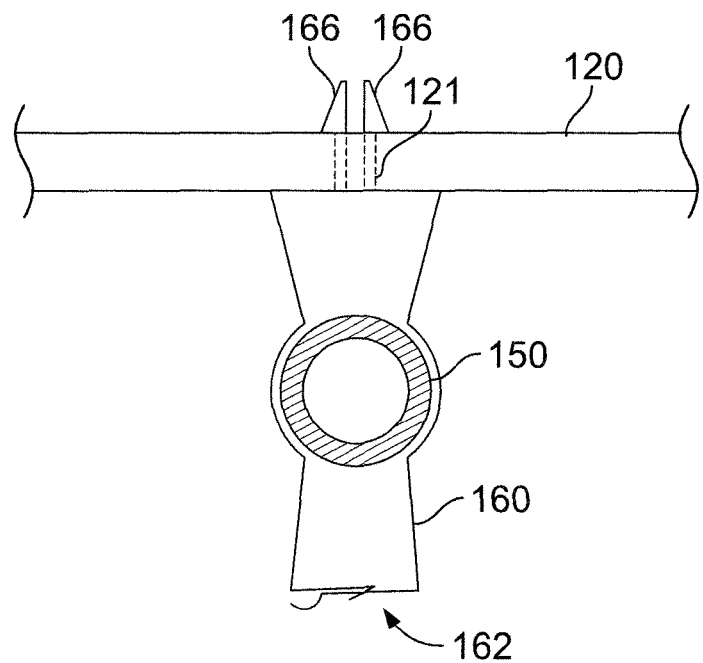

Referring to FIGS. 16A and 16B, an illustrative embodiment of a conduit clamping member 160 according to the present invention can optionally include a self-securing spring clip 162 at a one end for securing a conduit 150, and a pair of outwardly expanding extensions 164 at an opposite, mounting end. The expanding extensions 164 can be spring loaded or otherwise biased to project outwardly, and include an outwardly facing projections 166 on a distal end. Advantageously, when the extensions 164 are pressed into a connection hole 121 in the elongate platform 120 of a supporting device 130, the outwardly facing projections 166 are pressed inwardly by the interior wall of the hole 121, allowing the conduit clamping member 160 to translate upward and be securely seated against the bottom side of the elongate platform 120, as shown in FIG. 16B. Additionally, and also as shown in FIG. 16B, the outwardly facing projections 166 translate upwardly to clear through the hole 212 to the upper side of the platform, thus extending outwardly to catch in place adjacent hole 121, an securely retain the clamping member 160 to the platform 120. The clamping member 160 can be of typical metallic or nonmetallic material as is used in the industry, and the expanding extensions 164 and outwardly facing projections 166 can be of similar or other material, and can be biased outwardly, but resiliently pliable inwardly to allow insertion through hole 121 and subsequent self-expansion back outwardly as shown in FIG. 16B.

Regardless of whether the support devices in the embodiments described herein are made up of separate clamping members and elongate platforms that are coupled together with fasteners, or whether they are single-bodied support devices, all of the support devices herein can be pre-fitted at one or more of the connections, for example, through-holes of the elongate platforms, with one or more conduit securing members prior to being clamped via the clamping members' fasteners onto a structural member, such as the flange of an I-beam. Alternatively, fitting the support devices with the conduit securing members can be done after clamping the devices via the clamping members' fasteners onto the structural member(s). Depending on the location of the installation, and whether or not previous installations and/or interfering rods, beams, brackets and other devices already exist at the location, it may be advantageous to either pre-fit the support devices of the invention with the conduit securing members, or to first install the support devices herein under, over, between, or away from existing installations, then attaching the conduit securing members.

It is evident that the support devices herein offer significant advantages over existing systems, and allow for supporting and securing multiple conduits to structural members quickly and inexpensively. The support devices herein can also be used readily to install new conduits in addition to existing installations by making use of void, unused spaces on structural members, and, by virtue of their simple design, can easily fit between, over, under, or away from the existing installations, thus eliminating the need to disassemble and reassemble the existing installations. Moreover, the support devices herein offer advantageous versatility, adaptability and flexibility in regard to multi-directional disposition of the support system.

In one embodiment, described herein is a device for supporting and securing utility conduits to a building structural member, comprising: a clamping member, the clamping member including a connecting member and a first and second arm projecting from opposite ends of the connecting member; at least one elongate platform having spaced apart attachment points for securing the utility conduits; and a fastener, the fastener coupled to the first arm so that a portion of the building structural member is clamped between the fastener and the second arm.

In another embodiment, described herein is a support device as described above, wherein the clamping member and the at least one elongate platform are integrally formed in a single body.

In another embodiment, described herein is a support device as described above, wherein the fastener is a screw-type fastener.

In another embodiment, described herein is a support device as described above, wherein the spaced apart attachment points are a plurality of through-holes defined in the at least one elongate platform.

In another embodiment, described herein is a support device as described above, wherein the clamping member and the at least one elongate platform are coupled by at least one fastener.

In another embodiment, described herein is a support device as described above, further comprising at least one securing member coupled to the at least one elongate platform for securing utility conduits.

In another embodiment, described herein is a support device as described above, wherein the connecting member is fastened directly to the elongate platform.

In another embodiment, described herein is a support device as described above, wherein the second member is fastened directly to the elongate platform.

In another embodiment, described herein is a support device as described above, wherein the clamping member is located at an end of the at least one elongate platform.

In another embodiment, described herein is a support device as described above, wherein the clamping member is located at a center of the at least one elongate platform.

In another embodiment, described herein is a support device as described above, wherein the at least one elongate platform comprises at least one u-channel having lips and the clamping member is sized to fill a space defined between the lips.

In another embodiment, described herein is a support device as described above, wherein the connecting member is oriented perpendicular to the at least one elongate platform.

In another embodiment, described herein is a support device as described above, wherein a portion of the at least one elongate platform defines the connecting member.

While the invention has been illustrated and described in detail in the foregoing drawings and description, the same is to be considered as illustrative and not restrictive in character, it being understood that only illustrative embodiments thereof have been shown and described and that all equivalents and all changes and modifications known in the art that come within the spirit and scope of the invention as defined herein are desired to be protected. For example, although the illustrative embodiments relate to support devices and systems for securing utility conduits, the invention may also be used in other applications involving support devices for securing installations other than conduits.

The invention claimed is:

1. A system for supporting and securing utility conduits to a building structural member, comprising:
    a planar elongate platform having a plurality of spaced apart connections;
    a clamping member including a connecting member and a first and second arm projecting from opposite ends of a first side of the connecting member, a selectable one of the connecting member and second arm coupled directly to a selectable one of the spaced apart connections of the elongate platform; and
    a fastener coupled to the first arm for clamping a portion of the building structural member between the fastener and the second arm;
    wherein the plurality of spaced apart connections are further for selectively coupling utility conduit securing member to the planar elongate platform;
    wherein the plurality of spaced apart connections includes a plurality of sets of connections, each set having an equal number of uniformly spaced connections;
    wherein at least two of the plurality of sets of connections includes at least one connection specifically adapted for coupling the clamping member and at least one connection specifically adapted for coupling a utility conduit securing member;
    wherein each of the plurality of sets of connections includes three connections;
    a first one of the plurality of sets of connections includes a center connection specifically adapted for coupling the clamping member;
    a second one of the plurality of sets of connections includes a right of center connection specifically adapted for coupling the clamping member; and
    a third one of the plurality of sets of connections includes a left of center connection specifically adapted for coupling the clamping member.

2. The system of claim 1, wherein a fourth one of the plurality of sets of connections includes only connections specifically adapted for coupling the utility conduit securing member.

3. The system of claim 1, wherein the utility conduit securing member includes a conduit clamp.

4. The system of claim 3, wherein:
the conduit clamp on a coupling end include a pair of outwardly expanding extensions;
each of the pair of outwardly expanding extensions includes an outwardly facing projection on a distal end; and
the pair of outwardly expanding extensions are sized to extend through one of the plurality of connections in the elongate platform so that outward expansion of the extensions catches the projections on a side of the elongate platform opposite the conduit clamp, thereby retaining the conduit clamp to the elongate platform.

5. The system of claim 1, wherein the at least one connection specifically adapted for coupling the clamping member is a through hole and the at least one connection specifically adapted for coupling a utility conduit securing member is a threaded hole.

6. The system of claim 1, wherein the at least one elongate platform comprises a u-channel having lips and the clamping member is sized to fill a space defined between the lips.

7. The system of claim 1, wherein the connecting member can be selectively oriented perpendicular to or parallel to the at least one elongate platform.

\* \* \* \* \*